(12) United States Patent
Kim

(10) Patent No.: US 6,633,342 B2
(45) Date of Patent: Oct. 14, 2003

(54) APPARATUS AND METHOD FOR COMPENSATING IMAGE SIGNAL

(75) Inventor: Sang Yeon Kim, Kyonggi-do (KR)

(73) Assignee: LG Electronics Inc., Seoul (KR)

( * ) Notice: Subject to any disclaimer, the term of this patent is extended or adjusted under 35 U.S.C. 154(b) by 415 days.

(21) Appl. No.: 09/759,433

(22) Filed: Jan. 12, 2001

(65) Prior Publication Data

US 2001/0007478 A1 Jul. 12, 2001

(30) Foreign Application Priority Data

Jan. 12, 2000 (KR) .......................................... 2000-1417

(51) Int. Cl.[7] ............................. H04N 5/21; H04N 5/213
(52) U.S. Cl. ..................... 348/606; 348/607; 348/625; 382/261; 382/264; 382/266
(58) Field of Search ................. 348/606, 607, 348/608, 612, 624, 625, 627, 630, 683, 241, 242, 252, 253, 533; 382/254, 260, 261, 266, 264, 275, 199, 273; 358/3.26, 3.27, 463, 447; 375/285, 296, 346, 229, 222, 333, 18, 28 R; H04N 5/21, 5/213

(56) References Cited

U.S. PATENT DOCUMENTS 4,591,911 A * 5/1986 Tanaka et al. ............... 348/607
4,612,570 A * 9/1986 Nakagaki et al. ........... 348/624
4,825,297 A * 4/1989 Fuchsberger et al. ....... 348/606
5,016,104 A * 5/1991 Lim ........................... 348/608
5,557,340 A * 9/1996 Millward .................... 348/630
5,903,680 A * 5/1999 De Haan et al. ............ 382/265

FOREIGN PATENT DOCUMENTS

JP 03-132242 5/1991

* cited by examiner

*Primary Examiner*—Sherrie Hsia
(74) *Attorney, Agent, or Firm*—Lee, Hong, Degerman, Kang & Schmadeka

(57) ABSTRACT

An apparatus and method for eliminating noise of a received image and compensating its sharpness is provided. A common circuit is used in a structure for eliminating noise based on a double smoothing method and a structure for making the outline sharp based on an unsharp masking method. Noise elimination and sharpness enhancement are processed for a difference signal between an original signal of the image and its low pass filtered signal, thereby compensating the original signal. Thus, an image having an improved picture quality can be provided in a product which transmits/receives or displays image data, and high competitiveness of the product can be obtained by simplifying the user interface.

12 Claims, 8 Drawing Sheets

S(f) : power spectrum of noiseless
N(f) : power spectrum of white gaussian

P(t)

Y(t)

APPARATUS AND METHOD FOR COMPENSATING IMAGE SIGNAL

BACKGROUND OF THE INVENTION

1. Field of the Invention

The present invention relates to a method for compensating picture quality of an image signal, and more particularly to an apparatus and method for eliminating noise of a received image and improving its sharpness.

2. Description of the Related Art

Generally, a moving picture receiving system such as a TV includes a transmitter and a receiver. The transmitter converts a light energy sensed through a camera to an electrical signal and transmits the signal through analog or digital signal processing and channel coding. The receiver processes inverse steps of the transmitter to display a moving picture in a display device. The image displayed through a series of steps has noise due to various reasons and sharpness of the image is lowered due to limited bandwidth of transmission channels and physical characteristics of devices. Those noise and low sharpness cause a deterioration of picture quality. In order to solve the problem as described above, various methods for eliminating noise and improving sharpness have been developed. In general, it is known that noise in the natural world has white Gaussian characteristic. The noise in a frequency domain is uniformly distributed in a whole frequency band. On the other hand, the image signal is characterized in that most of power is concentrated in a low frequency area and power is rapidly reduced in a high frequency area. Accordingly, noise can be eliminated by low pass filtering as shown in FIG. 1.

However, as shown in FIG. 1, it is noted that high frequency components of the image signal are eliminated when the noise is eliminated. This deteriorates sharpness of the image.

Therefore, methods for eliminating noise while preserving high frequency components of the image have been suggested. Of them, there is a double smoothing method which is a low pass filtering method through two steps as shown in FIG. 2. That is, an input signal X(t) is input to a first delay 201 and a first low pass filter (LPF) 202 so that it is delayed by the first delay 201 and at the same time primarily low pass filtered by the first LPF 202. The primarily low pass filtered signal L(t) is output to a subtractor 203 and a second delay 205.

The subtractor 203 outputs a difference signal E(t) between a signal delayed by the first delay 201 and a signal primarily low pass filtered by the first LPF 202 to a second LPF 204. The second LPF 204 low pass filters the difference signal E(t) and outputs the low pass filtered signal to an adder 206. The adder 206 adds the low pass filtered signal of the second LPF 204 to a signal delayed by the second delay 205.

In other words, the double smoothing method of FIG. 2 is performed in such a manner that an image signal is primarily low pass filtered and a difference signal E(t) between an original image signal and the primarily low pass filtered signal is secondarily low pass filtered. A final output signal Y(t) is obtained by adding the secondarily low pass filtered signal N(t) to the primarily low pass filtered signal L(t). The first and second delays 201 and 205 respectively delay data as much as latency of the first LPF 202 and the second LPF 204.

FIGS. 3a to 3e show a method for eliminating noise when a unit step signal having noise is processed by the double smoothing method.

As shown in FIGS. 3a to 3e, the double smoothing method has a problem in that sharpness is deteriorated because the edge of the image is smoothed when eliminating noise.

Meanwhile, sharpness of the image in view of visual characteristic of human being is greatly varied depending on contrast of an outline portion. That is to say, sharpness is high as contrast of the edge region is great. This is obtained by amplifying high frequency components of the image. For example, if the high frequency components are amplified in a signal having abrupt brightness change, over shoot and under shoot occur around the outline, thereby increasing contrast.

There are methods for making the outline sharp, such as a second derivative method, a high pass filtering method, and an unsharp masking method.

Of them, the unsharp masking method has a structure of FIG. 4. That is, an original signal X(t) is delayed by a first delay 401 and at the same time low pass filtered by an LPF 402. A subtractor 403 extracts a difference signal E(t) between the delayed original signal and the low pass filtered signal L(t) and outputs the difference signal E(t) to a multiplier 404. At this time, the difference signal corresponds to high frequency components of the image. The multiplier 404 multiplies the high frequency components by α and then amplifies the resultant value. The amplified value is added to the original signal delayed by the first delay 401 by an adder 405. Thus, an image having fine sharpness can be obtained.

FIGS. 5a to 5e show a method for contrasting the outline by processing a unit step signal by the unsharp masking method to improve sharpness of the image.

The unsharp masking method has a problem that while improving sharpness, it also amplifies noise.

As described above, it can be recognized that the method for eliminating noise and the method for improving sharpness require contrary functions. That is, if noise is eliminated, the outline of the image is smoothed too, thereby deteriorating sharpness. If filtering is performed to improve sharpness, sharpness is obtained but noise is also amplified. The related art methods suggest algorithms targeting only one of the two missions, i.e., sharpness improvement or noise reduction. Accordingly, the two algorithms for sharpness improvement and noise reduction are sequentially applied, there is a problem that noise reduction performance and sharpness improvement performance are attenuated. Particularly, in case of deteriorating picture quality for the edge region, visual quality is deteriorated.

SUMMARY OF THE INVENTION

Accordingly, the present invention is directed to an apparatus and method for compensating an image signal that substantially obviates one or more of the problems due to limitations and disadvantages of the related art.

An object of the present invention is to provide an apparatus and method for compensating an image signal in which noise of an image signal is eliminated and an outline becomes sharp using one parameter by unifying algorithms for eliminating noise and making an outline sharp.

Another object of the present invention is to provide an apparatus for compensating an image signal in which the cost for implementing hardware is reduced by sharing a common portion in algorithms for eliminating noise and making an outline sharp.

Additional features and advantages of the invention will be set forth in the description which follows, and in part will be apparent from the description, or may be learned by practice of the invention. The objectives and other advantages of the invention will be realized and attained by the scheme particularly pointed out in the written description and claims hereof as well as the appended drawings.

To achieve these and other advantages and in accordance with the purpose of the present invention, as embodied and broadly described, an apparatus for compensating an image signal according to the present invention is characterized in that noise is eliminated and an outline becomes sharp by sharing a common portion in a structure for eliminating noise by a double smoothing method and a structure for making an outline sharp in an unsharp masking method.

The apparatus for compensating an image signal according to the present invention includes a first filter for low pass filtering an input signal, a subtractor for obtaining a difference signal between the input signal and the low pass filtered signal, a noise eliminating unit for eliminating noise while preserving high frequency components of an image from the difference signal, a multiplier for multiplying an output of the noise eliminating unit by a constant ($\alpha$+1), and an adder for adding the low pass filtered signal to the output of the multiplier.

In another aspect, a method for compensating an image signal according to the present invention is characterized in that noise reduction and edge sharpening are controlled by one parameter.

The method for compensating an image signal according to the present invention comprises the steps of low pass filtering an input signal, obtaining a difference signal between the input signal and the low pass filtered signal, eliminating noise only while preserving high frequency components of an image from the difference signal, multiplying the difference signal having no nose by a constant ($\alpha$+1), and adding the low pass filtered signal to the multiplied signal.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate an embodiment of the invention and together with the description serve to explain the principles of the invention.

In the drawings.

DETAILED DESCRIPTION OF THE PREFERRED EMBODIMENTS

Reference will now be made in detail to the preferred embodiments of the present invention, examples of which are illustrated in the accompanying drawings.

Figure 1:
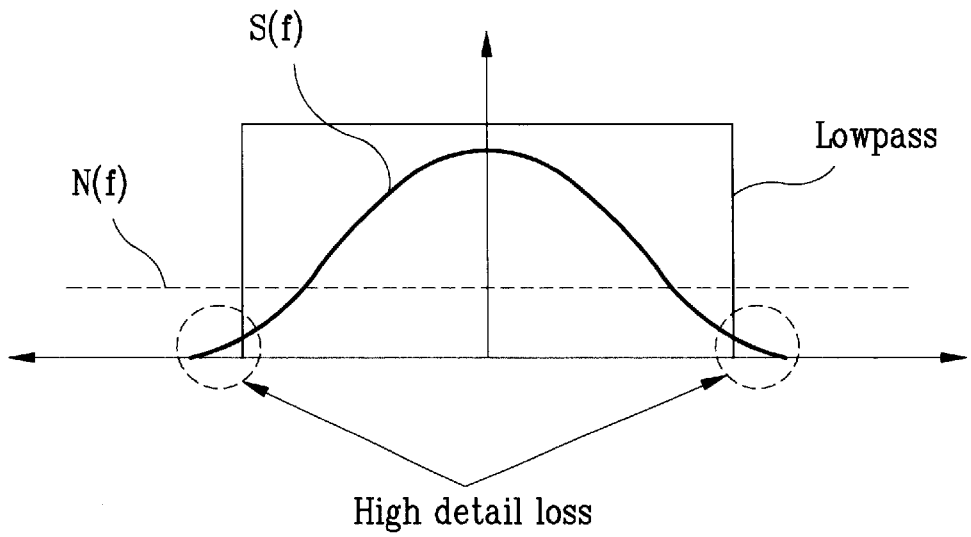
FIG. 1 shows a power spectrum of an image signal and noise.
Figure 2:
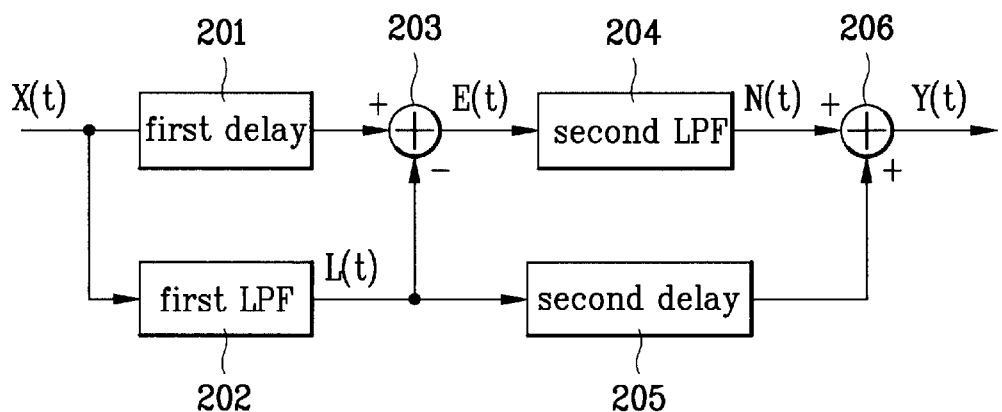
FIG. 2 is a block diagram of a noise eliminating unit by a general double smoothing method.
Figure 3A:
FIGS. 3a to 3e are operational waveforms of respective elements of FIG. 2.
Figure 3B:
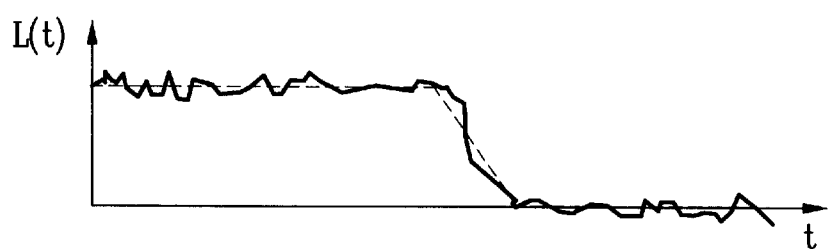
Figure 3C:
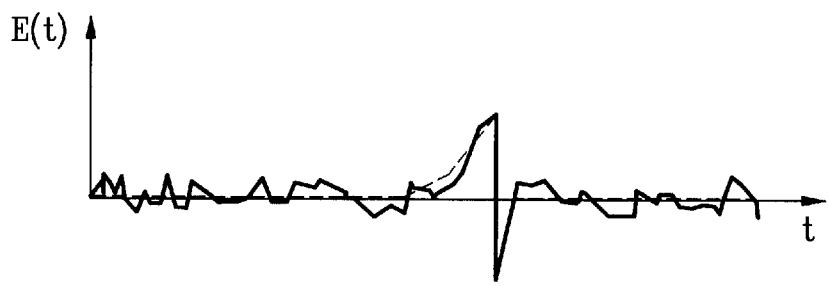
Figure 3D:
Figure 3E:

In a double smoothing method, actual noise elimination is performed in a second LPF. If such an actual noise elimination is expressed as a function $F_{NR}\{\cdot\}$, the double smoothing method of FIG. 2 can be expressed as equation 1 below.

$$Y(t)=F_{NR}\{E(t)\}+L(t) \tag{1}$$

Figure 4:
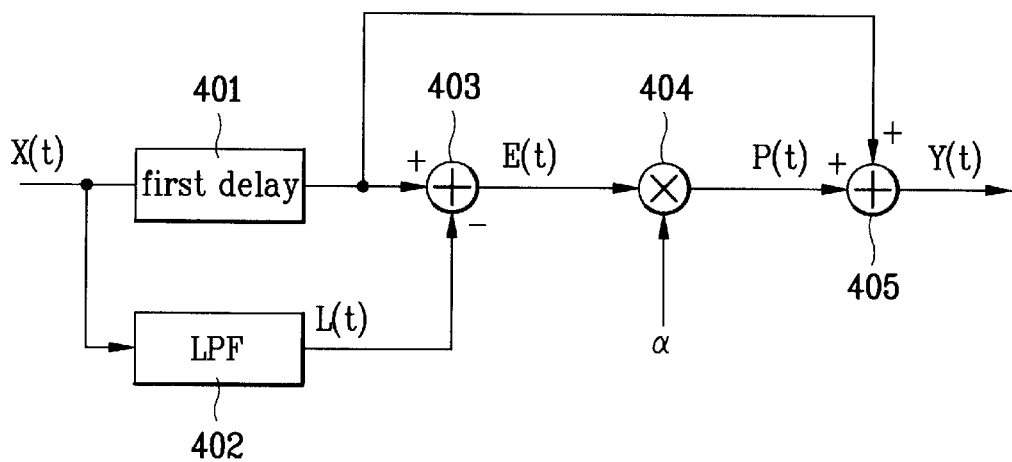
FIG. 4 is a block diagram of a unit for making outline sharp by a general unsharp masking method.
Figure 5A:
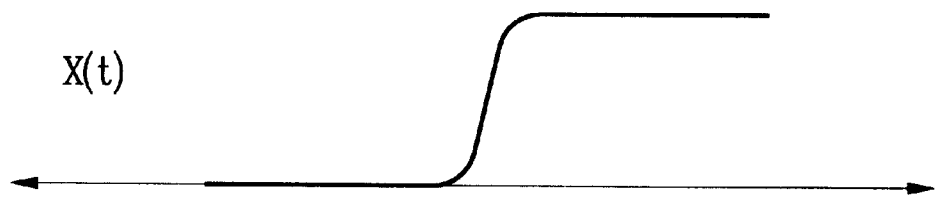
FIGS. 5a to 5e are operational waveforms of respective elements of FIG. 4.
Figure 5B:
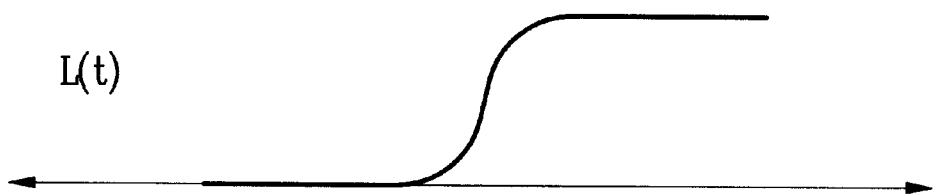
Figure 5C:
Figure 5D:
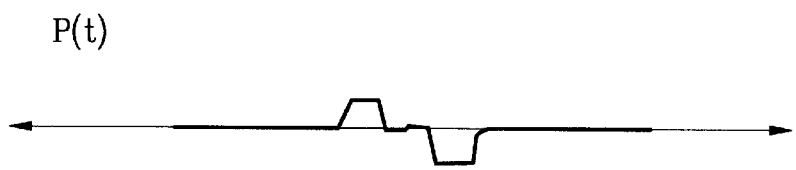
Figure 5E:
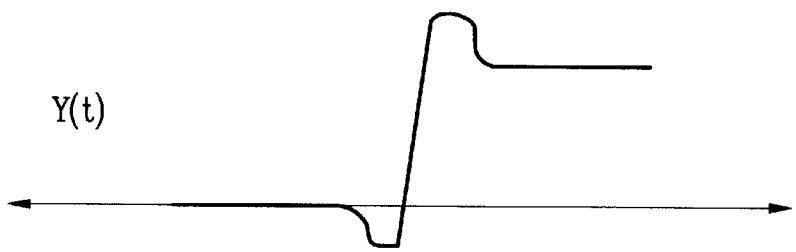

Meanwhile, an unsharp masking method of FIG. 4 can be expressed as equation 2 below.

$$Y(t)=\alpha \cdot E(t)+X(t)=\alpha \cdot E(t)+E(t)+L(t)=(1+\alpha)E(t)+L(t) \tag{2}$$

Here, it is noted that the above two equations have similar formats.

Accordingly, a method suggested by the present invention can be expressed as equation 3 below.

$$Y(t)=(1+\alpha)F_{NR}\{E(t)\}+L(t) \tag{3}$$

Figure 6:
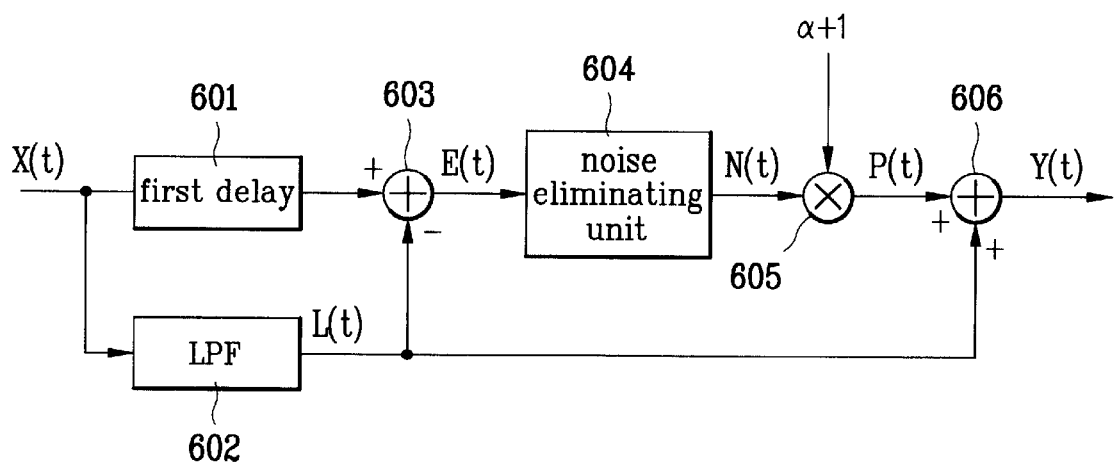
FIG. 6 is a block diagram of an apparatus for compensating an image signal according to the present invention.

FIG. 6 is a block diagram of an apparatus for compensating an image signal according to the present invention.

Referring to FIG. 6, the apparatus includes an LPF 602 for low pass filtering an input signal X(t), a delay 601 for delaying the input signal X(t) as much as processing time of the LPF 602, a subtractor 603 for subtracting the output of the LPF 602 from the output of the delay 601, a noise eliminating unit 604 for eliminating noise from the output signal E(t) of the subtractor 603, a multiplier 605 for multiplying the output of the noise eliminating unit 604 by a constant ($\alpha$+1), and an adder 606 for adding the output of the LPF 602 to the output of the multiplier 605.

Figure 7:
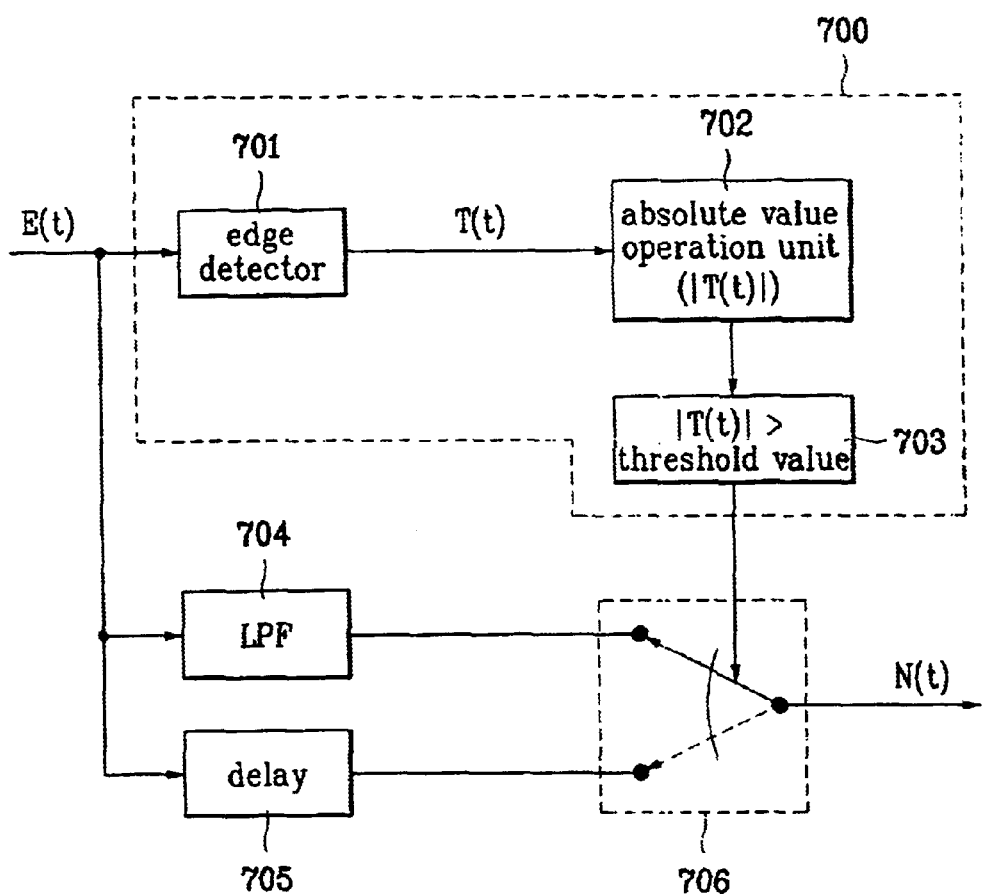
FIG. 7 is a detailed block diagram of a noise eliminating unit of FIG. 6.

FIG. 7 is a detailed block diagram of the noise eliminating unit 604. Referring to FIG. 7, the noise eliminating unit 604 includes an edge determinating unit 700 for determining an edge from the output signal E(t) of the subtractor 603, an LPF 704 for low pass filtering the output signal E(t) of the subtractor 603, a delay 705 for delaying the output signal E(t) of the subtractor 603 as much as processing time of the LPF 704, and a switching unit 706 selectively outputting the output of the LPF 704 or the output of the delay 705 in accordance with the determinating result of the edge determinating unit 700.

The edge determinating unit 700 includes an edge detector 701 for detecting an edge from the output signal E(t) of the subtractor 603, an absolute value operation unit 702 for obtaining an absolute value of the output of the edge detector 701, and a comparator 703 for comparing the output of the absolute value operation unit 702 with a predetermined threshold value and outputting the resultant value as a control signal.

At this time, actual noise elimination is performed in the LPF 704. Various non-linear filters may be used instead of the LPF 704.

The operation of the aforementioned apparatus for compensating an image signal according to the present invention can be described by the following four steps.

In step 1), a difference value between the signal X(t) having noise and the signal L(t) low pass filtered by the LPF 602 is obtained by the subtractor 603. This can be expressed as equation 4 below. At this time, the difference signal E(t) includes noise and high frequency components of the image.

$$E(t)=X(t)-L(t) \quad (4)$$

In step 2), the noise eliminating unit 604 eliminates noise for the difference signal E(t). At this time, various noise eliminating methods may be used. However, methods for eliminating noise only with retaining high frequency components of the image are required.

In step 3) the multiplier 605 obtains an amplified signal or reduced signal P(t) of the high frequency components of the image by multiplying the difference signal N(t) having no noise by α+1. In this case, a may have a value greater than or equal to 0. Sharpness of the outline and noise elimination characteristics are varied depending on a value of α. That is, if the value of α is small, it is likely that the high frequency components are eliminated. If the value of α is great, sharpness of edge becomes high.

In step 4), a finally output signal is obtained by adding the output signal P(t) of the multiplier 605 to the low pass filtered signal L(t) of the LPF 602 by the adder 606. This can be expressed as equation (5) below.

$$Y(t)=L(t)+P(t) \quad (5)$$

At this time, the noise eliminating unit 604 of FIG. 6 receives the difference signal E(t) to eliminate noise. Sharpness at the outline of the image is varied depending on the methods. That is, in the same manner as the double smoothing method, if a linear low band filter is used to eliminate noise, there is a problem that the outline is also smoothed when noise is eliminated. To solve this problem, various non-linear filters may be used.

As shown in FIG. 7, an edge portion of the image is detected and then noise eliminating filtering is performed not for the edge portion but for a portion other than the edge portion.

Figure 8A:
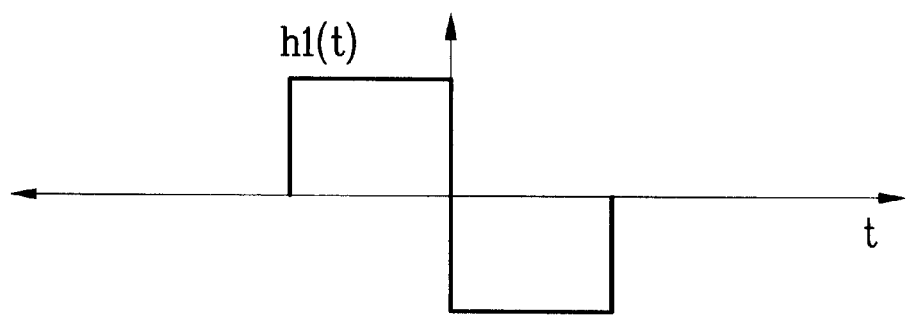
FIGS. 8a to 8c show examples of coefficient formats of an edge detecting filter of FIG. 7.
Figure 8B:
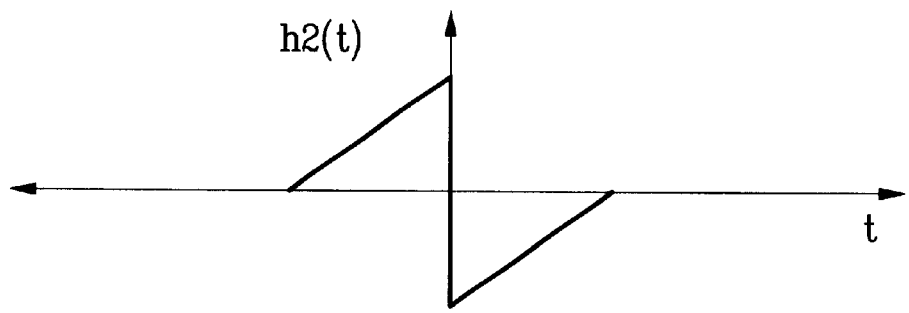
Figure 8C:
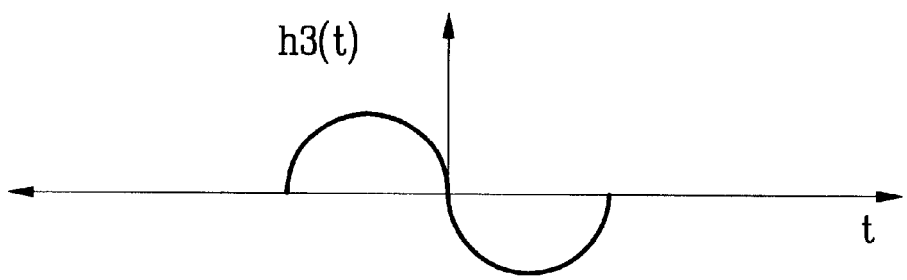
Figure 9A:
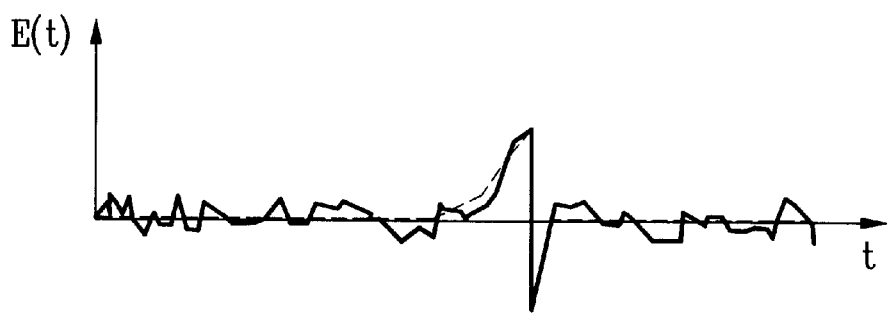
FIGS. 9a to 9c are operational waveforms of respective elements of FIG. 7.
Figure 9B:
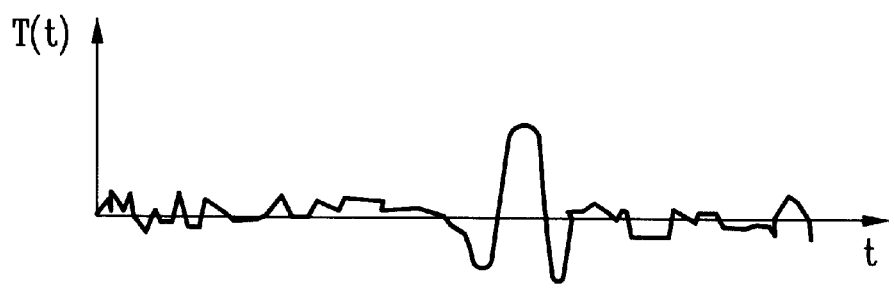

In other words, the edge detector 701 detects the edge from the difference signal E(t) as shown in FIG. 9a and obtains an absolute value from the absolute value operation unit 702. Thus, the edge detector 701 outputs the absolute value to the comparator 703 as shown in FIG. 9b. At this time, one of the filter coefficients as shown in FIGS. 8a to 8c may be used as the edge detecting filter.

The comparator 703 compares the output of the absolute value operation unit 702 with the threshold value. Then, the comparator 703 determines as the edge only if the output of the absolute value operation unit 702 is greater than the threshold value and outputs a corresponding control signal. That is, if the output of the absolute value operation unit 702 is greater than the threshold value, the comparator 703 determines the edge to select the output of the delay 705 which delays the difference signal E(t). If the output of the absolute value operation unit 702 is smaller than the threshold value, the comparator 703 controls the switching unit 706 to select the output of the LPF 704 which low pass filters the difference signal E(t).

Figure 9C:
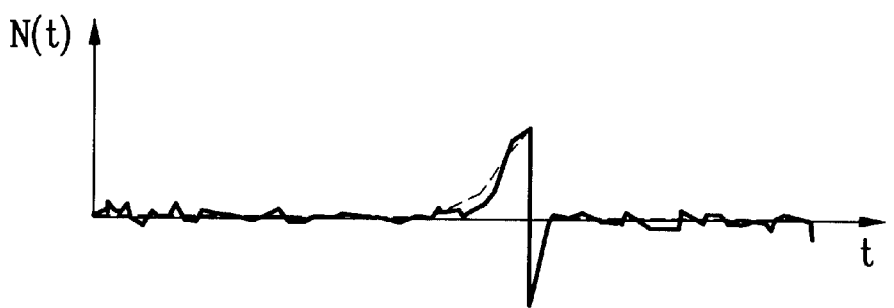

In this way, if the noise is eliminated for the difference signal E(t), a waveform having no noise is obtained as shown in FIG. 9c.

As described above, in the present invention, a common portion in a structure for eliminating noise by the double smoothing method and a structure for making an sharp edge in the unsharp masking method is shared, and noise elimination and sharpness are controlled by a single parameter.

Meanwhile, the apparatus according to the present invention is applicable to the products such as an analog and digital TV receiver, a digital camera, and a DVD player.

As aforementioned, the apparatus and method for compensating an image signal according to the present invention has the following advantages.

Since a common circuit is used in a structure for eliminating noise and a structure for making the outline sharp, the cost can be saved. A simple user interface can be obtained by controlling contrary characteristics such as noise elimination and outline sharpness using one parameter. Accordingly, an image having an improved picture quality can be provided in a product which transmits/receives or displays image data, and high competitiveness of the product can be obtained by simplifying the user interface.

While the present invention has been described and illustrated herein with reference to the preferred embodiments thereof, it will be apparent to those skilled in the art that various modifications and variations can be made therein without departing from the spirit and scope of the invention. Thus, it is intended that the present invention covers the modifications and variations of this invention that come within the scope of the appended claims and their equivalents.

What is claimed is:

1. An apparatus for compensating an image signal comprising:
   a first filter for low pass filtering an input signal;
   a subtractor for obtaining a difference signal between the input signal and the low pass filtered signal;
   a noise eliminating unit for eliminating noise while preserving high frequency components of an image from the difference signal;
   a multiplier for multiplying an output of the noise eliminating unit by a constant (α+1); and
   an adder for adding the low pass filtered signal to the output of the multiplier.

2. The apparatus of claim 1, further comprising a delay for delaying the input signal as much as filtering time of the input signal by the first filter and outputting the delayed signal to the subtractor.

3. The apparatus of claim 1, wherein the noise eliminating unit includes:
   an edge determinating unit for determining an edge from the difference signal;
   a second filter for low pass filtering the difference signal; and
   a selector selectively outputting the difference signal if the edge is determinated by the edge determinating unit while outputting the low pass filtered signal by the second filter if the edge is not determined by the edge determinating unit.

4. The apparatus of claim 3, wherein the edge determinating unit includes:
   an edge detector for detecting an edge from the difference signal;
   an absolute value operation unit for obtaining an absolute value of the detected edge; and
   a comparator for comparing the edge with the absolute value with a predetermined threshold value and outputting the resultant value as a control signal.

5. The apparatus of claim 3, wherein the second filter includes a linear low pass filter or a non-linear filter.

6. The apparatus of claim 3, wherein the noise eliminating unit further includes a delay for delaying the difference signal as much as filtering time of the difference signal by the second filter and outputting the delayed signal to the selector.

7. The apparatus of claim 1, wherein the constant α of the multiplier is greater than or equal to 0.

8. A method for compensating an image signal comprising the steps of:

low pass filtering an input signal;

obtaining a difference signal between the input signal and the low pass filtered signal;

eliminating noise only while preserving high frequency components of an image from the difference signal;

multiplying the difference signal having no noise by a constant ($\alpha+1$); and adding the low pass filtered signal to the multiplied signal.

9. The method of claim 8, wherein the step of eliminating noise performs noise eliminating filtering only for a portion other than an edge.

10. The method of claim 9, wherein the step of eliminating noise includes the steps of:

detecting the edge from the difference signal;

low pass filtering the difference signal; and selectively outputting the difference signal if the edge is detected while outputting the low pass filtered signal of the difference signal if the edge is not detected.

11. The method of claim 10, wherein the step of detecting the edge includes the steps of obtaining an absolute value of the detected edge from the difference signal, comparing the edge with the absolute value with a predetermined threshold value, and determining the edge if the edge with the absolute value is greater than the threshold value.

12. The method of claim 8, wherein the constant $\alpha$ is greater than or equal to 0.

* * * * *